United States Patent
Margalith et al.

(10) Patent No.: US 7,233,392 B2
(45) Date of Patent: Jun. 19, 2007

(54) SPECTRAL IMAGING DEVICE WITH TUNABLE LIGHT SOURCE

(75) Inventors: Eli Margalith, Solana Beach, CA (US); Rhett James Barnes, San Diego, CA (US)

(73) Assignee: Opotek, Inc., Carlsbad, CA (US)

( * ) Notice: Subject to any disclaimer, the term of this patent is extended or adjusted under 35 U.S.C. 154(b) by 303 days.

(21) Appl. No.: 10/810,777

(22) Filed: Mar. 25, 2004

(65) Prior Publication Data
US 2005/0213089 A1 Sep. 29, 2005

(51) Int. Cl.
*G01J 3/00* (2006.01)

(52) U.S. Cl. ............... 356/300; 356/417; 356/317; 356/318

(58) Field of Classification Search ............... 356/300, 356/417, 317, 318
See application file for complete search history.

(56) References Cited

U.S. PATENT DOCUMENTS 3,628,872 A * 12/1971 Miranda ............... 356/432
6,766,184 B2 * 7/2004 Utzinger et al. ............. 600/407
2002/0114553 A1 * 8/2002 Mead et al. ................. 385/10
2005/0226815 A1 * 10/2005 Kawakami et al. .......... 424/9.6

* cited by examiner

Primary Examiner—Renee Luebke
Assistant Examiner—Jessica L McMillan
(74) Attorney, Agent, or Firm—John R. Ross; John R. Ross, III (57) ABSTRACT

A spectral imaging device with a narrow band spectrally tunable light source. The light source includes an optical parametric oscillator that can be tuned across a wide range of wavelengths while illuminating a target. In a preferred embodiment, a Q-switched YAG laser pumps the OPO. Two-dimensional images of the target may be detected at various wavelengths by a imaging sensor with a many pixel focal plane array to generate data arrays known as hyperspectral image cubes. These images detecting variations is optical parameters including transmission, reflectivity, and fluorescence of the target can be obtained in various spectral ranges from ultraviolet to infrared for a variety of applications in metrology, agriculture, life sciences, and in the pharmaceutical industry.

13 Claims, 5 Drawing Sheets

Reflectivity spectra at one pixel

FIG. 8

SPECTRAL IMAGING DEVICE WITH TUNABLE LIGHT SOURCE

FIELD OF THE INVENTION

The present invention relates to imaging devices and in particular to tunable light sources for multi-spectral imaging devices

BACKGROUND OF THE INVENTION

Near infrared spectroscopy is recognized as an important diagnostic analytical tool in a wide variety of industries, including agriculture, medicine, and chemical and pharmaceutical production. The information obtained is used for checking source materials, process intermediates, and characterization and validation of finished products. The technique is based on measuring the wavelength dependent spectral response of materials (absorption, reflection, polarization etc.) as a function of wavelength. Each material has a unique spectral signature, which can be recorded and used for identification. These instruments may obtain spectral information utilizing either a broadband light source to illuminate a sample and a filter to select the wavelength reaching these detectors, or use dispersing elements (e.g. a grating or prism) or filters to select a single wavelength from a broad light source to illuminate the sample. The signal from the sample is then collected by a detector, which provides averaged information about a target area within the field of view of the instrument.

In cases where spatial information is required a typical solution is to perform multiple single-point measurements over different areas of the target, or scan the target. The resolution of the image is determined by the field of view of the detector. The main drawback of this technique is the length of time it takes to compile the multiple points that make up a spectral image, which limits the practicality of imaging instruments utilizing this approach.

It is also known to use detector arrays to obtain spectral data. In a typical prior art instrument broadband near infrared light source may be used to illuminate a target. The light from the target is passed through either a set of fixed wavelength transmission filters or a tunable filter that passes only a narrow spectral band. The light is then collected by an imaging detector array, which operates in the near infrared spectral range. The imaging array records the image of the target at a number of wavelengths and the collected data is used to construct a hyper-spectral cube consisting of the spectral responds of each point as a function of illumination wavelength. The performance of such prior art systems is limited by numerous factors:

The intensity of a wideband source within a spectral band is inversely proportional to the bandwidth, therefore in order to increase the signal intensity of a given source the spectral resolution must be sacrificed.

The use of discrete filters provides a limited data set consisting only of a small set of discrete wavelengths.

Tunable filters, such as a liquid crystal tunable filter, limit the field of view of the camera as well as the intensity of the collected signal.

The spectral range is limited by the material properties of the filters, e.g. liquid crystal tunable filters operate in the range of 1100–1800 nm, whereas significant spectral information is available at longer wavelengths.

Selecting a wavelength from a broadband light source either by dispersive elements or filters results in low intensity that limits the types of measurements and samples that can be analyzed.

Tunable optical parametric oscillators produce narrow band light across a broad wavelength spectrum. They are very well known and have been available for many years. The OPO wavelength is determined by the choice of the non-linear crystal, the pump wavelength, the temperature of the crystal, and the orientation of the crystal with respect to the pump laser beam. Wide wavelength tuning is achieved by varying the angle between the optical axis of the crystal and the direction of the pump beam (angle tuning). The spectral resolution of the instrument is defined by the OPO linewidth. The linewidth of the OPO beam is primarily a function of the crystal material, the crystal orientation, and the pump wavelength, e.g. a relatively narrow linewidth of less than 10 $cm^{-1}$ is obtained over a wavelength range of 410–2600 nm from an OPO incorporating a BBO crystal in a type II orientation, pumped at 355 nm.

Spectral imaging, and specifically NIR imaging, is well documented in the literature and in numerous patents: Prior art U.S. Pat. No. 5,528,368 presents a NIR imaging device (microscope) based on a broadband NIR light source and tunable filters. U.S. Pat. No. 5,679,954 discuses the use of special bundle of fiber optics to convey infrared light for infrared spectroscopy of solid compounds of organic base. U.S. Pat. No. 5,214,277 discloses a support structure for holding a sample (a pharmaceutical product) for NIR spectroscopy. U.S. Pat. No. 6,690,464 describes an instrument in which multiple LED emitting a various wavelengths are used as the light source. U.S. Pat. No. 6,323,944 discloses a system incorporating a white light source and two sets of filters for hyper-spectral imaging of fluorescence. U.S. Pat. No. 6,236,047 discloses a method for multi-spectral analysis of organic blood analytes in noninvasive infrared spectroscopy. The system includes a broadband source and filters. Applicants' Patents related to the present invention include U.S. Pat. Nos. 5,276,548 and 6,259,160 both relating to optical parametric oscillators. All of the above patents are incorporated herein by reference.

SUMMARY OF THE INVENTION

The present invention provides a spectral imaging device with a narrow band spectrally tunable light source. The light source includes an optical parametric oscillator that can be tuned across a wide range of wavelengths while illuminating a target. In a preferred embodiment the OPO is pumped by a Q-switched YAG laser. Spatial images of the target at various wavelengths may be detected by an imaging sensor with a multi-pixel focal plane array detector to generate data arrays known as hyper-spectral image cubes. These images detect variations in optical parameters including transmission, reflectivity, and fluorescence of the target, which can be obtained in various spectral ranges from ultraviolet to infrared for a variety of applications in metrology, agriculture, life sciences, and in the pharmaceutical industry.

DETAILED DESCRIPTION OF PREFERRED EMBODIMENTS

First Preferred Embodiment

Figure 1:
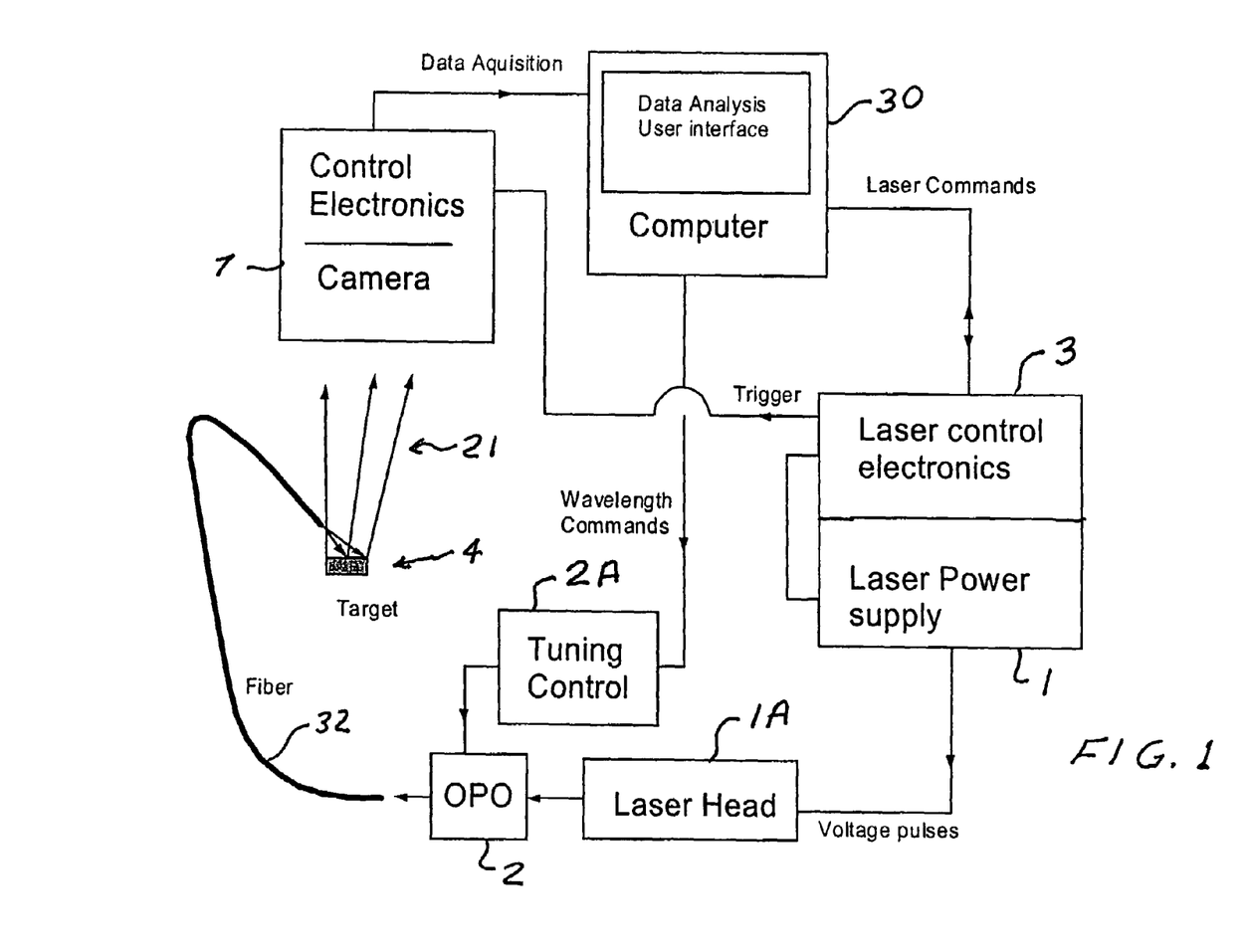
FIG. 1 is a schematic presentation of a preferred embodiment of the present invention.

A first preferred embodiment of the present invention is shown in FIG. 1. A target 4 is illuminated over a wide spectral range with short duration spectrally narrow-band pulses using an optical parametric oscillator 2 pumped by laser 1. (The optical parametric oscillator may comprise a type I or a type II bulk non-linear crystal.) A number of two-dimensional images are captured by camera 7 at each narrow spectral range. Computer 30 controls the entire system as well as processes the data and analyzes it. The user of the instrument may select the operating parameters, such as the wavelength range, and the wavelength step size. Computer 30 commands the OPO to tune to the first wavelength and issues a command to fire the laser. The computer will then command the OPO to tune to the next wavelength and the process will repeat until the OPO will complete tuning over all the wavelengths in the pre-determined wavelength range selected by the user. For each laser pulse, the laser control electronics generates a timing pulse that is used to trigger the control electronics of the camera as well as the laser. The trigger pulse is set to precede the laser pulse to assure that the camera aperture is open when the laser fires. The camera electronics should be set for a short data acquisition time (such as less than 1 micro-second) in order to maximize the signal-to-noise ratio in presence of other light sources in the ambient. The OPO pulse is only about 5 ns, so there should be no problem in synchronizing the illumination with the collection of the reflected light by the camera.

The OPO beam preferably is collected by optical fiber 32 and directed to illuminate the target. The reflected light from the target is imaged by the camera on its focal plane array detectors. The signal collected at each pixel of the array carries information regarding the reflectivity of the target at the position that corresponds to that pixel and at each narrow band wavelength range of light provided by the OPO. The information from all the pixels for every pulse of the OPO is stored by computer 30.

Figures 7, 8:
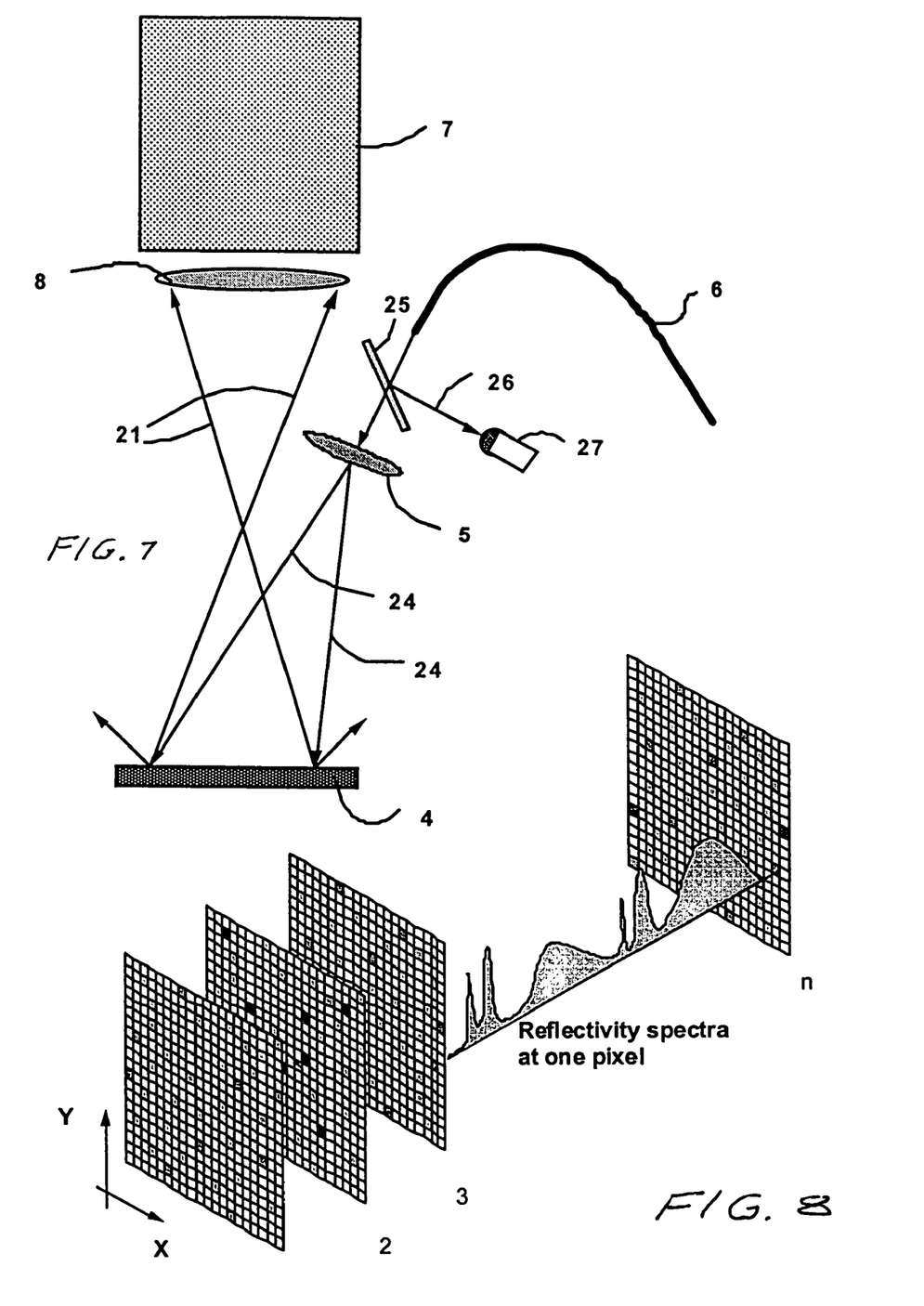
FIG. 7 is a schematic presentation of a concept of sampling the output of the OPO to provide reference that is used by the data acquisition software to normalize the data and minimize the effect of the OPO pulse energy fluctuations.
FIG. 8 shows a presentation of hyper-spectral image data.

Computer 30 preferably uses the collected data to create a "hyperspectral cube" as presented in FIG. 8. At each OPO wavelength $\lambda_1, \lambda_2, \ldots \lambda_n$, a matrix of data points representing the reflection of the sample is collected. The reflection of the sample as a function of wavelength at any point is obtained by plotting the data at the correlating pixel information as a function of wavelength, as presented schematically in the FIG. 8.

In this preferred embodiment the OPO system 2 is a commercial product, the VIBRANT model 355 II, manufactured by OPOTEK, Inc. (Similar OPO systems are commercially available from suppliers such as Continuum Lasers and Spectra-Physics.) The VIBRANT system includes an optical head 2, laser head 1A, power supply 1 and control electronics 3. The OPO incorporates non-linear crystals (Beta Barium Borate, BBO supplied by InRAD) and it can be tuned continuously over the spectral range from 410 nm in the visible to over 2.4 microns in the near infrared. The wavelength range can be further extended by frequency doubling to cover the range of 210 nm–410 nm in the ultraviolet. The wavelength tuning is motorized and controlled by a computer.

In the case of NIR Imaging, the idler beam of the OPO, in the range of 710–2400 nm, preferably is coupled into an optical fiber (not shown) for illumination of target, 4 in this longer wavelength range. For wavelengths below 2 microns this fiber can be a Silica/Silica fiber, 1 mm diameter model Optran WF available from Ceramopec, for longer wavelengths fibers made of IR transmitting material such as sapphire can be used. The OPO beam is focused into the fiber with a simple spherical lens having a 50 mm focal length, and the fiber tip is held away from the focal plane of the lens to avoid damage to the fiber. The optical fibers are positioned to illuminate the target 4. The target can be a pharmaceutical sample such as tablets. Optical elements (not shown) may be placed between the output end of the fibers and the target. These optical elements can be simple spherical lenses. The size of the illuminated spot on the target can be controlled by selecting the focal length of the lenses and the distance between the lens to the fiber and to the target.

The camera can be an InGaAs FPA, such as offered by Sensors Unlimited which operates in the spectral range of 700–1700 nm, or an InSb Camera such as offered by Santa Barbara Focalplane that can cover the entire near infrared range and beyond. The spatial resolution of the image is defined by the field of view of each of the sensors (pixels) in the array. These cameras are available with more than 640.times.512 pixels in the array. The camera electronics controls the recording of the images and can provide time gating. The data acquisition should be synchronized with the firing of the laser, preferably such that the frame rate will be equal with the pulse repetition rate of the laser. The time gate of the camera will be adjusted to capture each reflected signal from the target.

The instrument in the preferred embodiment can be used in numerous pharmaceutical applications. These applications include Identification of raw materials, identification of packaging material, identification of drugs, and screening for counterfeit drugs. The spatial resolution can be designed to meet the requirements of the application by selecting the geometry of the instrument and the optical magnification. Microscopic as well as macroscopic spectral images can be acquired. One preferred application is the non-destructive testing of finished tablets to confirm the distribution and quantity of the active ingredients in the tablet.

In this application the OPO is tuned over a wavelength range in the NIR associated with the spectral features of the active pharmaceutical ingredients and the excipient mixture, and the reflected light from the target is collected and recorded at each wavelength. The collected data provides the reflectivity at each point of the target (as set by the spatial resolution) for each wavelength. As described above, the data has three dimensions: two spatial and one that carries spectral information to provide a hyper-spectral cube. The data may also be presented to the user in the form of a two-dimensional picture, color-coded to represent the distribution of the different materials in the tablet.

The spectral information at each pixel is correlated with that of the known information about the target and its ingredients to provide information about the content as well as the spatial distribution of these materials in the target. Statistical methods, such as principal components analysis and partial least square can be applied for identification of the materials. Various well known techniques for analysis of the data can be used including those used with present commercial instruments that utilize broadband light sources and filters for providing spectral analysis of targets, such as the Matrix-NIR by Spectral Dimensions. These techniques are detailed in numerous publications.

Alternative Configurations

Reflective and Refractive Optics

Figures 2, 3:
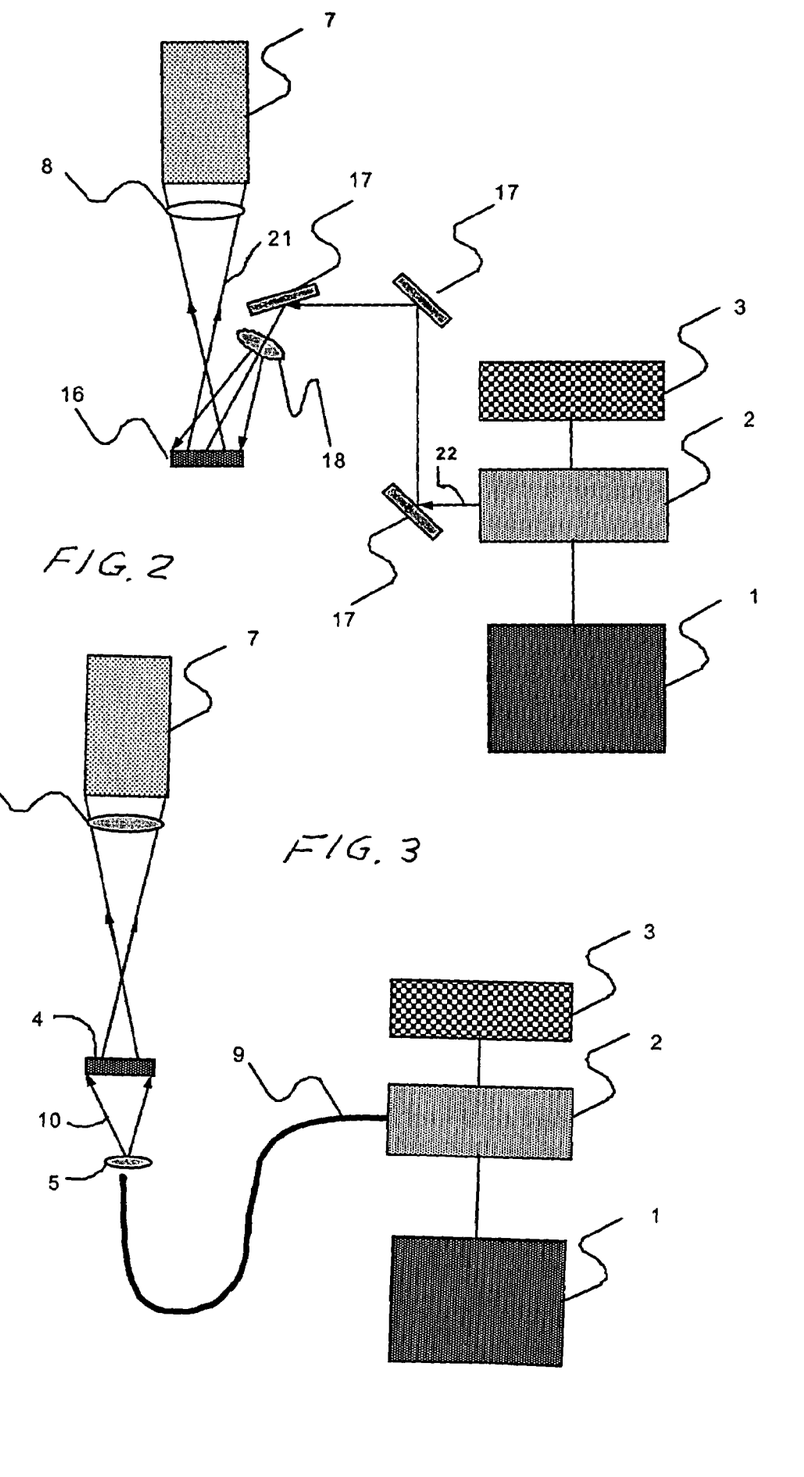
FIG. 2 presents a similar system as in FIG. 1 except that the light from the OPO is directed to the target with simple optics, mirrors and lenses instead of optical fibers.
FIG. 3 is a schematic presentation of a similar instrument as in FIG. 1 except that the target is illuminated from one side and the transmitted optical signal is recorded by a camera placed on the other side of the target.
Figures 4, 5:
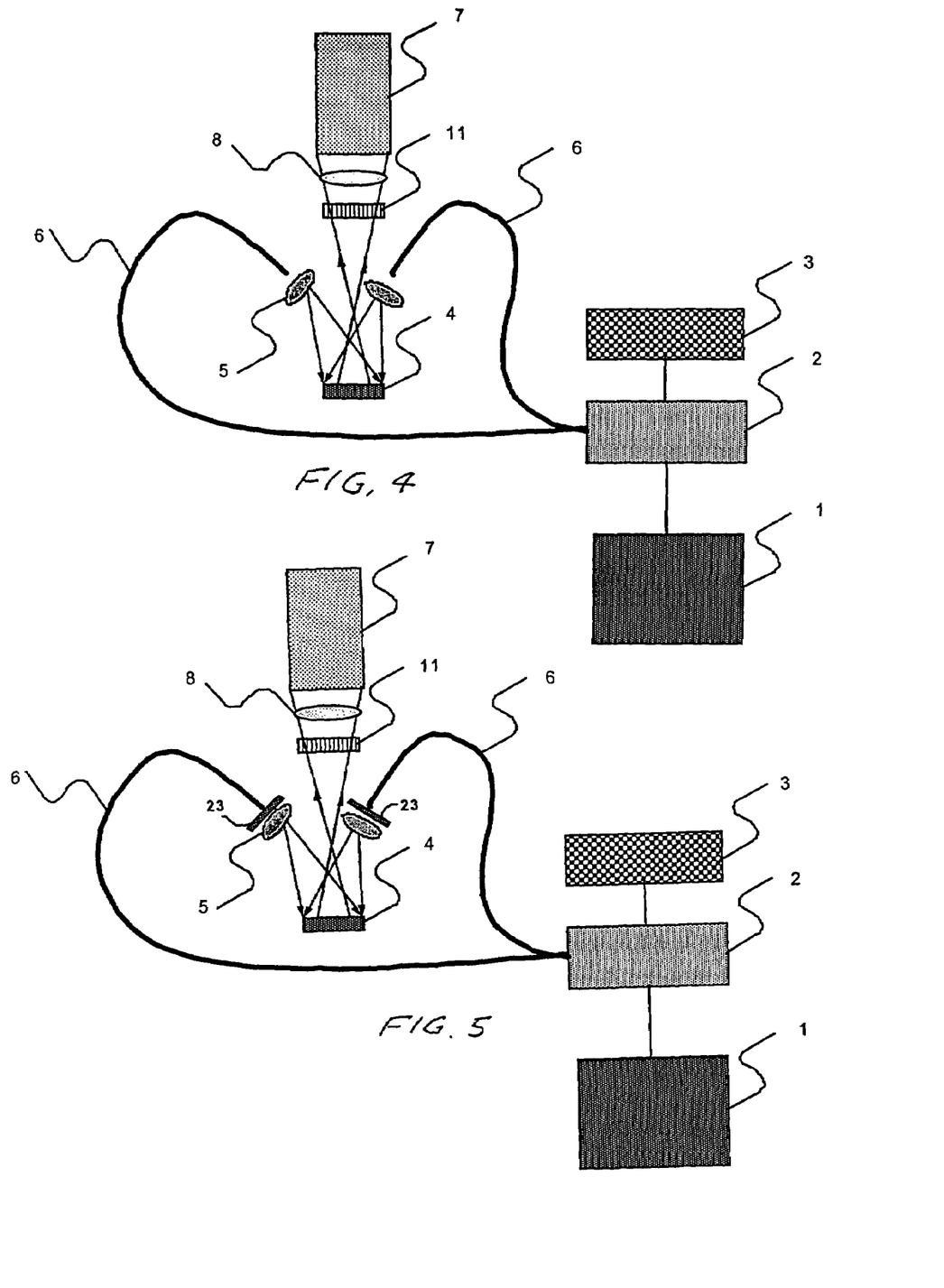
FIG. 4 is a schematic presentation of a similar instrument as in FIG. 1 with the addition of a transmission filter placed in front of the camera.
FIG. 5 is a schematic presentation of a similar instrument as in FIG. 1 with the addition of a polarizer at the output end of the fiber.
Figure 6:
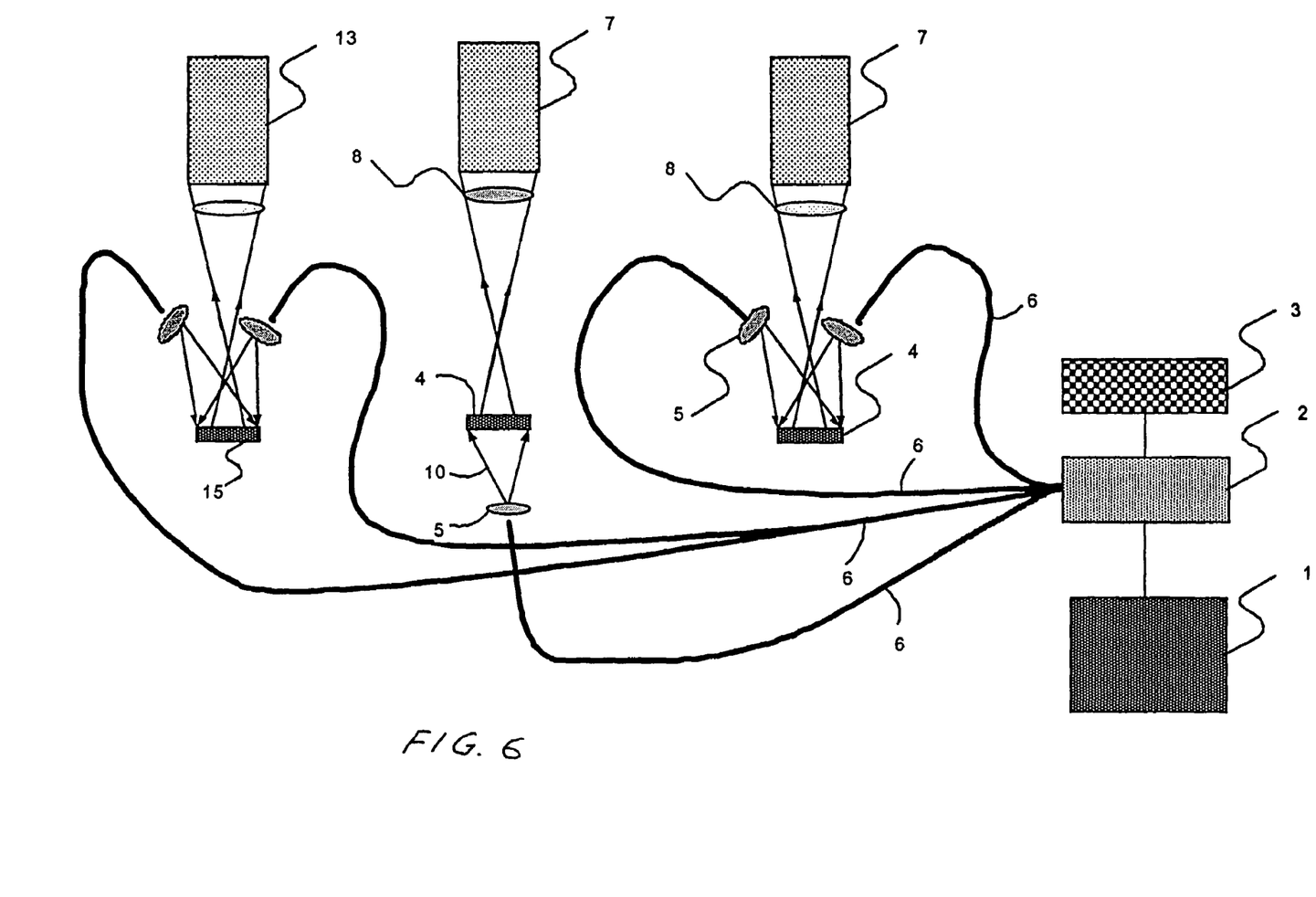
FIG. 6 presents the concept of using a single instrument for multiple test stations.

The light from the OPO can be directed to the target by means of simple reflective and refractive optics such as mirrors and lenses, as presented schematically in FIG. 2. This approach may be preferable at NIR wavelengths where some fibers exhibit high transmission losses.

Calibration and Correction for Fluctuations

Techniques are available to correct for random fluctuations in the output energy of the OPO that can affect the accuracy of quantitative measurements. A standard technique to reduce the effect of random fluctuations is to perform multiple measurements at each wavelength and average the signals in order to increase the accuracy of the collected data. The measurements can be analyzed using statistical procedures to correct for random and systematic variations. However, this method may require long time. A preferred method in which the effect of the energy fluctuations can be significantly reduced, or even eliminated is to normalize the collected signals with respect to the actual output energy of the OPO at each measurement. In this method the energy (or power) of the OPO beam is sampled at every measurement as presented schematically in FIG. 7. In this figure, a beam-splitter 25 is placed at the exit of the optical fiber 6. A fraction of the OPO beam 26 is reflected from the beam splitter into a detector 27. The energy recorded by the detector is proportional to the energy of the OPO beam that illuminates the target. The detector can be calibrated to provide quantitative information regarding the reflectivity of the target. In the calibration mode, a material with a known reflectivity is placed at the target position and the signal measured by each of the detectors in the array is recorded.

Transmission

Similar calibration can be performed for instruments that are configured to measure other optical parameters such as transmission, fluorescence etc. The instrument can be configured to obtain spectral imaging of transmitted light through the target. Images of transmitted light can provide integrated information of the material composition within the target in the volume acquired by each sensor in the array. FIG. 3 is a schematic drawing of a spectral imaging instrument operating in transmission mode. The basic components are the same as in FIG. 1 except that the light from the OPO is directed to one side of the target whereas the camera is placed on the opposite side. The OPO can be delivered by one or more fibers such as fiber 9, or by simple optics as discussed in FIG. 2. Other optical components shown in the figures. including FIGS. 4 through 7, are lenses 5,8 and 18, beam directions 10, 21, 22 and 24, camera 13, targets 15 and 16 and mirrors 17.

Fluorescence

Other optical parameters can be acquired by a spectral imaging instrument to identify and analyze materials. The illumination of the target with the OPO beam can induce fluorescence emission at specific wavelengths, which can be imaged as a function of the excitation (OPO) wavelength, as presented schematically in FIG. 4. Referring to this figure, a filter 11, or selection of filters to cover a broader wavelength region, is placed in front of the camera to block the OPO wavelength while transmitting the fluorescence from excited components of the sample.

Dichroism

Another optical parameter that can be imaged is the Circular Dichroism of the material. Circular Dichroism (CD) is observed when optically active matter absorbs left and right hand circular polarized light slightly differently. By placing a polarizer and a quarter waveplate at the exit end of the fiber (element 23 in FIG. 5) the OPO light will be circularly polarized. The reflected light from the material can be imaged to provide spatial information of the CD as a function of wavelength.

Optical Fibers

Various optical techniques can be applied to illuminate the target with the OPO beam. The beam can be delivered to the target using reflective optics (mirrors), or via a single or multiple optical fibers. The use of optical fibers, which is generally ineffective with conventional light sources, provides extreme flexibility in the design and use of the instrument. The illumination angle and the field of view can be easily controlled. Shadows can be removed by illuminating the target by multiple fibers. The same instrument can be used in transmission as well an in reflection modes. A single instrument can serve multiple sites, and the location of the light source can be physically separated from the target if required so by the application.

One of the main advantages of using an OPO as the light source for spectral imaging is the ability to deliver it via an optical fiber. The fiber provides numerous benefits:

Beam Uniformity: The fiber acts as a beam homogenizer. The beam is mixed as it propagates along the fiber, and regardless of the input spatial distribution profile the resulting output beam has a "flat" uniform distribution across the beam diameter. Moreover, the beam divergence is almost independent of the output wavelength and the beam diameter on the target does not change when the wavelength is changed.

Field of View: The beam diameter on the target can be easily controlled either by varying the distance of the fiber output from the target or by positioning optics (e.g. lenses) at the output of the fiber.

System Configuration: The laser can be physically separated from the testing area. The laser and the power supply can be placed in an area that can be easily accessed for maintenance and service, whereas the beam is delivered via fiber to the test area, which can be in a clean room.

Flexibility: The use of fiber enables easy switching from reflection to transmission measurement etc.

Multiple users: The beam can be injected simultaneously into multiple fibers that can be routed to different test stations. This will allow for significant cost savings.

The use of optical fibers to deliver the OPO beam provides ultimate flexibility in designing a spectral imaging instrument. It permits separation of the OPO system from the test area and quick switching from one measurement configuration to another (e.g. from reflection to transmission). Another advantage provided by the use of optical fibers is the potential in using a single instrument to serve multiple test stations, as presented schematically in FIG. 6. In general, all the configurations discussed in this patent that use optical fiber, can be connected to a single OPO. The OPO output can be coupled into a fiber bundle and illuminate, either simultaneously, or at different times multiple targets at different locations, and different configurations.

Intensity Control

The intensity of the beam on the target can be controlled by varying the OPO output power. This can be achieved by either controlling the power of the pump laser or by placing a variable attenuator in the path of the OPO beam. The output of the OPO can be monitored and recorded continuously in order to provide reference that can be used to normalize the data and correct for fluctuation of the OPO as shown in FIG. 7. A beam splitter (e.g. thin transparent window at 45°) can be placed at the exit of the fiber to reflect a few percent of the beam into a photocell. The signal read by the photocell will be directly proportional to the actual energy that will illuminate the sample.

Detection Level

The spectral intensity of the OPO, or the light intensity within the spectral bandwidth, which is higher by several orders of magnitude over that of filtered broadband light sources, will enable recording weak signals that are impossible to detect otherwise by presently available devices. In a conventional configuration the intensity of the signal reaching the sensors is relatively low. The signal intensity is limited by the emission intensity of the light source within the spectral band of the filter, by the power limitation imposed by the filter, and by the filter throughput. The signal has to be acquired over an integration time, which is determined by the camera sensitivity and the source spectral brightness. The present invention eliminates all these limitations. The intensity of the OPO is orders of magnitude higher than that of conventional light sources. The temporal pulse length of the OPO is on the order of a few nanoseconds, which results in peak intensities on the order of a 100 kW to 10 MW at the pulse energies typically produced. The short pulse duration of the OPO enables the use of gated detectors. Utilizing a gated sensor array will enable operation in the presence of other ambient light sources (e.g. outdoors) without the need to shield the detectors. The short pulse can enable taking spectral images of moving (e.g on a conveyer belt) or vibrating targets, as the target will be effectively still during the OPO pulse. Another advantage that may result from the high intensity of the OPO is the possibility of using less sensitive sensors that operate at room temperature, and are therefore less expensive.

Fast Data Collection

The OPO wavelength is tuned by rotating the non-linear crystal inside its cavity. The OPO can be designed to match the tuning speed with the frame rate of the camera to obtain fast data collection. In example, at a standard OPO pulse repetition rate of 20 Hz, and a matching camera frame rate the instrument will be able to record 20 2-D images per second, each at a different wavelength.

Wider Wavelength Range

The wavelength range of present Spectral Imaging instruments is dictated by the emission of the light source and the transmission of the filters. A typical Liquid Crystals Tunable Filter (LCTF) offers partial transmission the range of 1100–1800 nm. A single OPO system can provide continuous tuning from about 200 nm in the UV to over 2500 nm in the IR.

Spectral Resolution

The spectral linewidth of the OPO is dictated by the design and it can be narrower than achieved from tunable filters used for spectral imaging. An injection seeded OPO can operate in a single-longitudinal-mode with a linewidth on the order of $0.01$ $cm^{-1}$. A type II OPO (e.g. incorporating a BBO crystal pumped at 355 nm) generates linewidth in the range of $4-7$ $cm^{-1}$ (from a fraction of a nm to a few nm depending on the wavelength), which is narrower than most filters with an acceptable transmission.

Field of View (FOV) and Throughput

Tunable transmission filters operate within limited field of view (LCTF are limited to 7°). This imposes constrains on the design of the optical layout, the size of the target, or the efficiency in collecting the light from the target. The transmission (or throughput) of such filters depends on the spectral linewidth and the wavelength. None of these limitations apply to the present invention.

While the present invention has been described above in terms of specific preferred embodiments, persons skilled in this art will recognize that there are many variations and modifications that could be made. Different types of OPO could be used such as designs that incorporate periodically polled materials, in example LiNnO3 (PPLN) or KTP (PP-KTP), or other non-linear materials Also, the targets may be an array of wells each containing identical or different targets.

Therefore, the scope of the invention should be determined by the appended claims and not limited by the above descriptions.

What is claimed is:

1. A spectral imaging device with a narrow band spectrally tunable light source for obtaining multi-spectral images of a target, said device comprising:
   A) a tunable optical parametric oscillator for producing short pulses of light at a plurality of selected narrow band wavelengths within a broad spectral range,
   B) a short pulse laser driving said optical parametric oscillator,
   C) one or more optical components for conveying or directing said short pulses of light to said target,
   D) a camera comprising a many pixel array detector, said camera being adapted to detect light at the same selected narrow band wavelengths directly produced by said tunable optical parametric oscillator and reflected from or transmitted through said target and to produce multi-spectral images of said target.

2. The device as in claim 1 wherein said one or more optical components for conveying or directing said short pulses of light to said target is one or more optical fibers.

3. The device as in claim 1 wherein said one or more optical components for conveying or directing said short pulses of light to said target comprises refractive or reflective optical elements.

4. The device as in claim 1 wherein said camera is a gated camera synchronized with said optical parametric oscillator to maximize signal to noise ratio.

5. The device as in claim 1 wherein the optical parametric oscillator comprises a type I bulk non-linear crystal.

6. The device as in claim 1 wherein the optical parametric oscillator comprises a type II bulk non-linear crystal.

7. The device as in claim 1 and further comprising additional non-linear optical devices for extending spectral ranges of said device.

8. The device as in claim 1 wherein said camera is positioned to monitor reflections from said target.

9. The device as in claim 1 wherein said camera is positioned to monitor transmissions through said target.

10. The device as in claim 1 wherein said camera is positioned to monitor dichroism of said target.

11. The device as in claim 1 wherein said target is a pharmaceutical product.

12. The device as in claim 1 wherein said target is an array of samples containing identical or different materials.

13. The device as in claim 1 wherein said OPO incorporates a periodically polled material, which can be operated in a pulsed or continuous mode.

* * * * *